(12) United States Patent
Arakita et al.

(10) Patent No.: US 8,478,006 B2
(45) Date of Patent: Jul. 2, 2013

(54) IMAGE PROCESSING APPARATUS AND IMAGE PROCESSING METHOD

(75) Inventors: Kazumasa Arakita, Nasushiobara (JP); Toshiyuki Sato, Nasushiobara (JP)

(73) Assignees: Kabushiki Kaisha Toshiba, Tokyo (JP); Toshiba Medical Systems Corporation, Tochigi-Ken (JP)

( * ) Notice: Subject to any disclaimer, the term of this patent is extended or adjusted under 35 U.S.C. 154(b) by 923 days.

(21) Appl. No.: 12/546,412

(22) Filed: Aug. 24, 2009

(65) Prior Publication Data

US 2010/0053160 A1    Mar. 4, 2010

(30) Foreign Application Priority Data

Aug. 29, 2008   (JP) ................. 2008-222647

(51) Int. Cl.
*G06K 9/00*   (2006.01)

(52) U.S. Cl.
USPC ........................................... 382/128

(58) Field of Classification Search
USPC ............. 600/407, 425; 382/128, 130–134, 382/276; 347/424, 427; 345/427, 424
See application file for complete search history.

(56) References Cited

U.S. PATENT DOCUMENTS

| | | | | |
|---|---|---|---|---|
| 2004/0220466 A1* | 11/2004 | Matsumoto | ................ | 600/407 |
| 2004/0249270 A1* | 12/2004 | Kondo et al. | ................ | 600/425 |
| 2006/0291705 A1* | 12/2006 | Baumann et al. | ............ | 382/128 |
| 2008/0100621 A1* | 5/2008 | Aharon et al. | ................ | 345/424 |
| 2008/0303818 A1* | 12/2008 | Moriya | ..................... | 345/427 |
| 2010/0239140 A1* | 9/2010 | Ruijters et al. | ............... | 382/130 |

FOREIGN PATENT DOCUMENTS

| | | |
|---|---|---|
| JP | 2004-313736 A | 11/2004 |
| JP | 2008-000270 A | 1/2008 |

OTHER PUBLICATIONS

Bauer,C. et al., ANovelApproach forDetection ofTubularObjects & ItsApplication toMedicalImage Analysis. Proc. 30th DAGM symp. PatternRecognition.Lect.Notes in Comp.Sci. vol. 5096, Jan. 1, 2008. pp. 163-172. (Retr. fr Int. Sep. 22, 2012).URLs: <http://dx.doi.org/10.1007/978-3-540-69321-5_17>, <http://www.springerlink.com/content/48768441x1827776/fulltext.pdf>.*
Geoffrey D. Rubin et al, "Measurement of the Aorta and Its Branches with Helical CT", Radiology 1998, vol. 206, No. 3, pp. 823-829, Mar. 1998.
JP Office Action with English Translation for JP Patent Application No. 2008-222647 mailed on Nov. 13, 2012.

\* cited by examiner

*Primary Examiner* — Lena Najarian
*Assistant Examiner* — Natalie A Pass
(74) *Attorney, Agent, or Firm* — Yoshida & Associates, LLC

(57) ABSTRACT

An extraction unit extracts a centerline of a tubular structure from a volume data set. A generation unit generates a plurality of image data sets concerning a plurality of curved planes based on the volume data set. Each of the curved planes contains the centerline. The plurality of image data sets have a plurality of image lengths respectively and contain a plurality of centerlines respectively. A first specification unit specifies a first image data set or a second image data set from the plurality of image data sets. The first image data set is specified based on the plurality of image lengths of the plurality of image data sets. The second image data set is specified based on gradients of the plurality of centerlines of the plurality of image data sets. A display unit displays the first image or the second image.

4 Claims, 8 Drawing Sheets

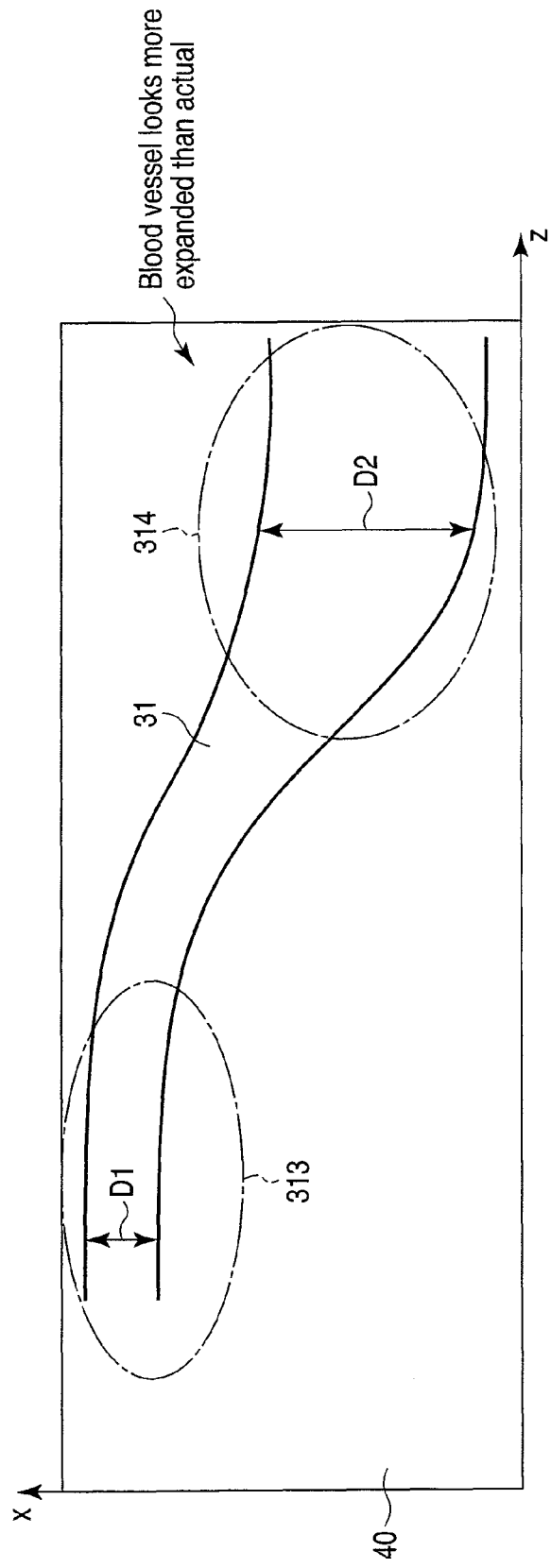
F I G. 4
CPR image data set 40 concerning curved plane 33 constituted by plurality of cutting lines 34 shown in FIG. 3

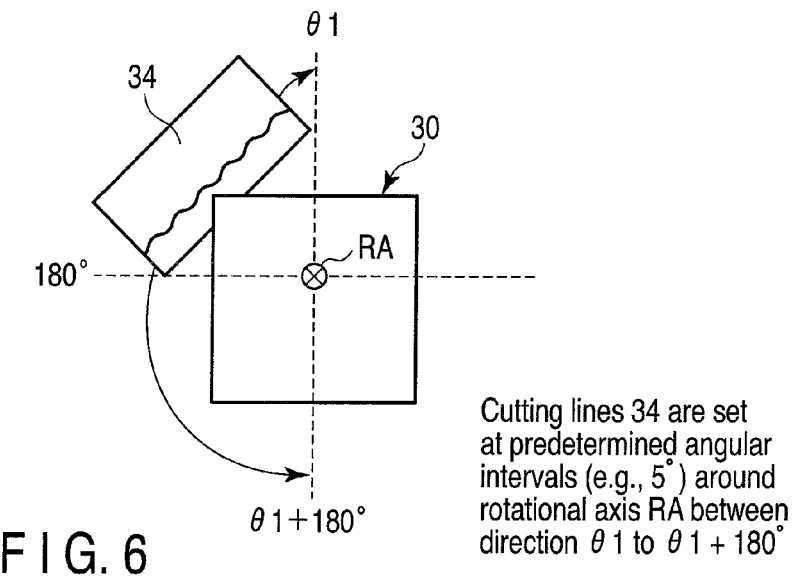
FIG. 6
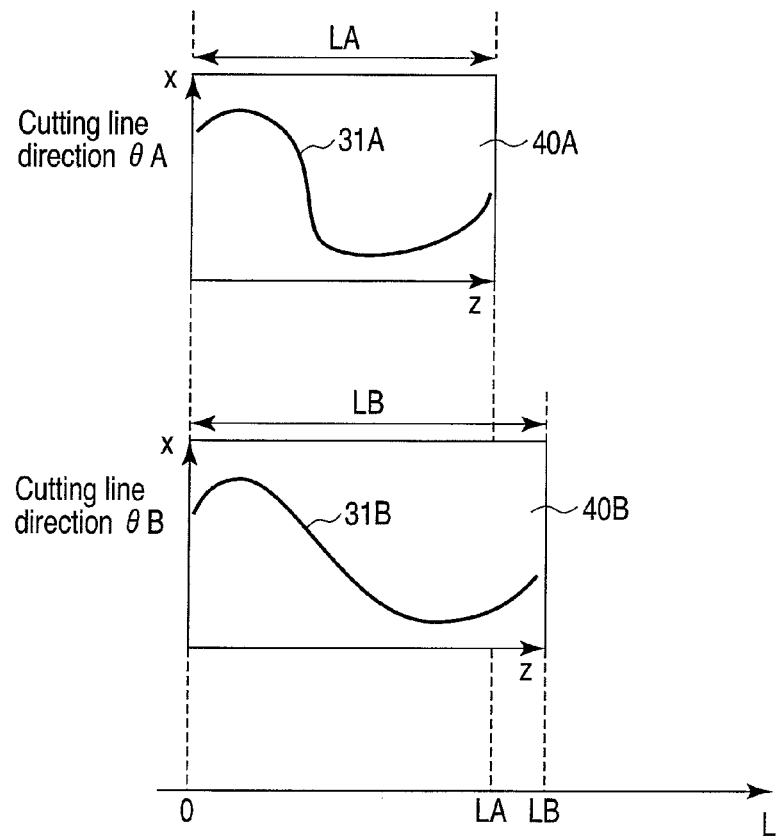
FIG. 7  Image length LA < image length LB

US 8,478,006 B2

IMAGE PROCESSING APPARATUS AND IMAGE PROCESSING METHOD

CROSS-REFERENCE TO RELATED APPLICATIONS

This application is based upon and claims the benefit of priority from prior Japanese Patent Application No. 2008-222647, filed Aug. 29, 2008, the entire contents of which are incorporated herein by reference.

BACKGROUND OF THE INVENTION

1. Field of the Invention

The present invention relates to an image processing apparatus and image processing method which generates curved multi-planar reconstruction (CPR) image data sets.

2. Description of the Related Art

The CPR method is known as a method of observing a tubular structure contained in volume data obtained by an X-ray computer tomography apparatus, magnetic resonance imaging apparatus, or the like. In the CPR method, cutting lines are initially set parallel to the X-axis, Y-axis, or Z-axis. This method then initially displays a CPR image (curved plane image) concerning a curved plane (curved cross-section) formed by cutting the volume data set with the set cutting lines along the centerline of a tubular structure. However, when a portion extending in a direction parallel to the cutting lines is observed with a CPR image, it is difficult to grasp the positional relationship. In addition, a parallel portion on the image is disturbed. In this case, the user needs to manually set the direction of the cutting lines again to a direction suitable for observation. This prolongs the image diagnosis time.

BRIEF SUMMARY OF THE INVENTION

It is an object of the present invention to provide an image processing apparatus and image processing method which improves the efficiency of image diagnosis using CPR image data sets.

According to a first aspect of the present invention, an image processing apparatus includes: a storage unit configured to store a volume data set containing a tubular structure; an extraction unit configured to extract a centerline of the tubular structure from the volume data set; a generation unit configured to generate a plurality of image data sets concerning a plurality of curved planes based on the volume data set, each of the curved planes containing the centerline, and the plurality of image data sets having a plurality of image lengths respectively and containing a plurality of centerlines respectively; a first specification unit configured to specify a first image data set or a second image data set from the plurality of image data sets, the first image data set being specified based on the plurality of image lengths of the plurality of image data sets, and the second image data set being specified based on gradients of the plurality of centerlines of the plurality of image data sets; and a display unit configured to display the first image or the second image.

According to a second aspect of the present invention, an image processing method includes: extracting a centerline of a tubular structure from a volume data set; generating a plurality of image data sets concerning a plurality of curved planes based on the volume data set, each of the curved planes containing the centerline, and the plurality of image data sets having a plurality of image lengths respectively and containing a plurality of centerlines respectively; specifying a first image data set or second image data set from the plurality of image data sets, the first image data set being specified based on the plurality of image lengths of the plurality of image data sets, and the second image data set being specified based on gradients of the plurality of centerlines of the plurality of image data sets; and displaying the first image or the second image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is another view for explaining the disturbance of a CPR image data set;

FIG. 6 is a view for explaining cutting line setting processing in steps SA2 and SA6 in FIG. 5;

FIG. 7 is a graph for explaining specification processing for a longest CPR image in step SA7 in FIG. 5;

DETAILED DESCRIPTION OF THE INVENTION

An image processing apparatus and image processing method according to an embodiment of the present invention will be described below with reference to the views of the accompanying drawing.

Figure 1:
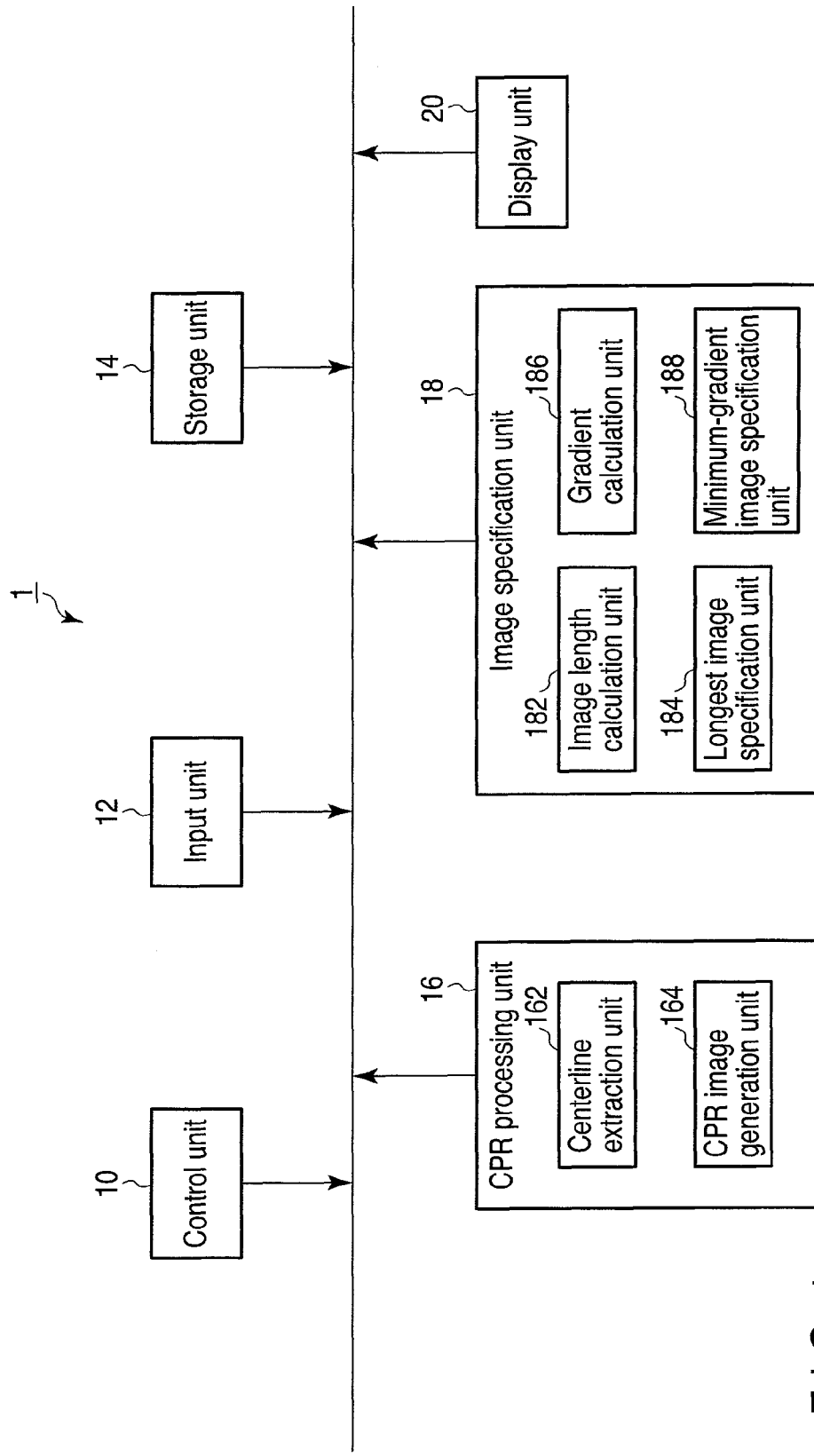
FIG. 1 is a block diagram showing the arrangement of an image processing apparatus according to an embodiment of the present invention.

FIG. 1 is a block diagram showing the arrangement of an image processing apparatus according to an embodiment of the present invention. As shown in FIG. 1, an image processing apparatus 1 includes a control unit 10 as a central unit, an input unit 12, a storage unit 14, a CPR processing unit 16, an image specification unit 18, and a display unit 20.

The input unit 12 accepts various commands and information inputs from a user. As the input unit 12, a pointing device such as a mouse or trackball, a selection device such as a switch button, or an input device such as a keyboard can be used, as needed.

The storage unit 14 stores a volume data set concerning a tubular structure. The volume data set is generated by an X-ray computer tomography apparatus (X-ray CT apparatus), magnetic resonance imaging apparatus (MRI apparatus), ultrasonic diagnosis apparatus, nuclear medicine diagnosis apparatus, or the like. Tubular structures include all kinds of tubular structures such as a blood vessel, intestine, and gullet. Assume that for a detailed description to be given below, a tubular structure is a blood vessel enhanced by a contrast agent. Volume data set includes the data of a plurality of slice images arrayed along the slice direction.

The CPR processing unit 16 reads a volume data set stored in the storage unit 14 and performs CPR processing. As shown in FIG. 1, the CPR processing unit 16 includes a centerline extraction unit 162 and a CPR image generation unit 164. The centerline extraction unit 162 extracts the centerline of a blood vessel from a volume data set by using an existing technique. The CPR image generation unit 164 generates a plurality of CPR image (curved plane image) data sets concerning a plurality of curved planes containing the centerline extracted by the centerline extraction unit 162. The details of CPR processing by the CPR processing unit 16 will be described later.

The image specification unit 18 specifies a CPR image set with the least image disturbance from a plurality of CPR image data sets generated by the CPR processing unit 16. As shown in FIG. 1, the image specification unit 18 includes an image length calculation unit 182, a longest image specification unit 184, a gradient calculation unit 186, and a minimum-gradient image specification unit 188. The image length calculation unit 182 calculates a plurality of image lengths from the plurality of CPR image data sets generated by the CPR processing unit 16, respectively. The longest image specification unit 184 specifies a CPR image data set having the longest image length from the plurality of CPR image data sets. A CPR image data set having the longest image length will be referred to as a longest CPR image data set hereinafter. The gradient calculation unit 186 calculates the maximum gradients of a plurality of centerlines contained in the plurality of CPR image data sets respectively. The minimum-gradient image specification unit 188 specifies a CPR image data set containing a centerline having the minimum gradient of the plurality of maximum gradients from the plurality of CPR image data sets. A CPR image data set containing a centerline having the minimum gradient of the plurality of maximum gradients will be referred to as a minimum-gradient CPR image data set hereinafter. Image specification processing by the image specification unit 18 will be described in detail later.

The display unit 20 displays the longest CPR image or minimum-gradient CPR image specified by the image specification unit 18. As the display unit 20, for example, a CRT display, liquid crystal display, organic EL display, or plasma display can be used.

The control unit 10 controls the overall image processing apparatus 1. Upon receiving a request signal to start longest CPR image display processing from the input unit 12, the control unit 10 controls the respective units of the image processing apparatus 1 to execute longest CPR image display processing. Upon receiving a request signal to start minimum-gradient CPR image display processing from the input unit 12, the control unit 10 controls the respective units of the image processing apparatus 1 to execute minimum-gradient CPR image display processing.

Figure 2:
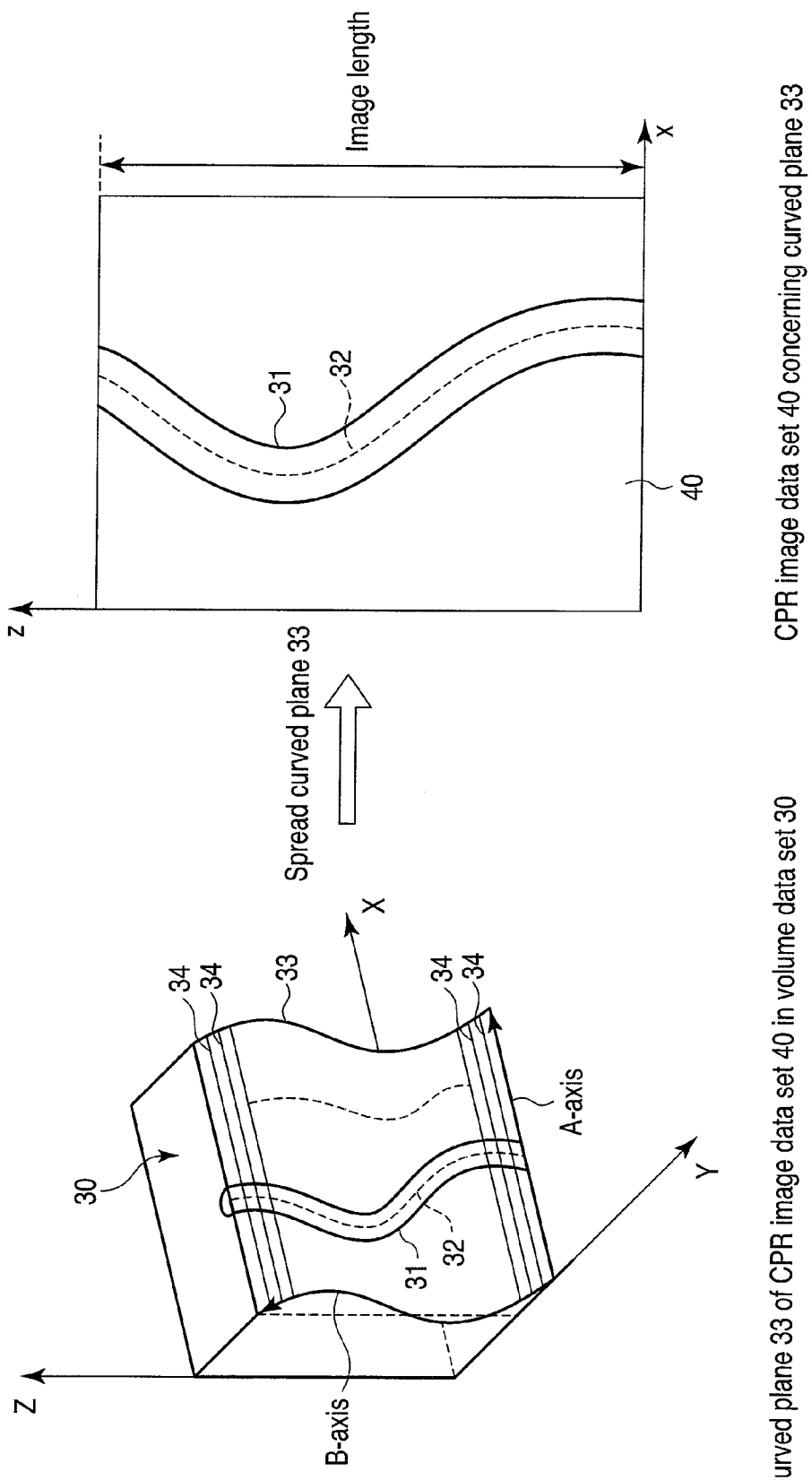
FIG. 2 is a view for explaining the principle of CPR image generation processing.

CPR image generation processing will be described next. FIG. 2 is a view for explaining the principle of CPR image generation processing. Assume that the Z-axis of the X-Y-Z orthogonal coordinate system shown in FIG. 2 is defined as the slice direction (the body axis of the subject). As shown in FIG. 2, CPR image generation processing is characterized by planarly visualizing an overall blood vessel 31 meandering in a volume data set 30 without any overlap by using a centerline 32 of the blood vessel 31.

As shown in FIG. 2, a plane 33 of a CPR image data set 40 is a curved cross-section. The curved plane 33 is constituted by a plurality of cutting lines 34 respectively passing through a plurality of points constituting the centerline 32. In this manner, the plane 33 is set in the volume data set 30 along the centerline 32. All the cutting lines 34 concerning one CPR image data set 40 have the same direction. The direction of the cutting lines 34 is defined by angles relative to the X-, Y-, and Z-axes. Typically, the cutting line 34 is set in a plane (X-Y plane) perpendicular to the Z-axis. The cutting line 34 in FIG. 2 is set in the X-Y plane so as to be parallel to the X-axis. Spreading the curved plane 33 constituted by the plurality of cutting lines 34 on a flat plane will obtain the CPR image data set 40.

As shown in FIG. 2, in this case, an A-B coordinate system is defined on the curved plane 33. The A-axis is defined parallel to the cutting line 34. The B-axis is defined perpendicular to the A-axis along the curved plane 33. That is, when observing the A-B coordinate system from the X-Y-Z coordinate system, the B-axis looks curved relative to the Y-axis like the centerline 32. With the use of the A- and B-axes, the coordinate system of the CPR image data set 40 is defined by the x-axis parallel to the A-axis and the z-axis obtained by linearizing the B-axis so as to be parallel to the Z-axis.

Figure 3:
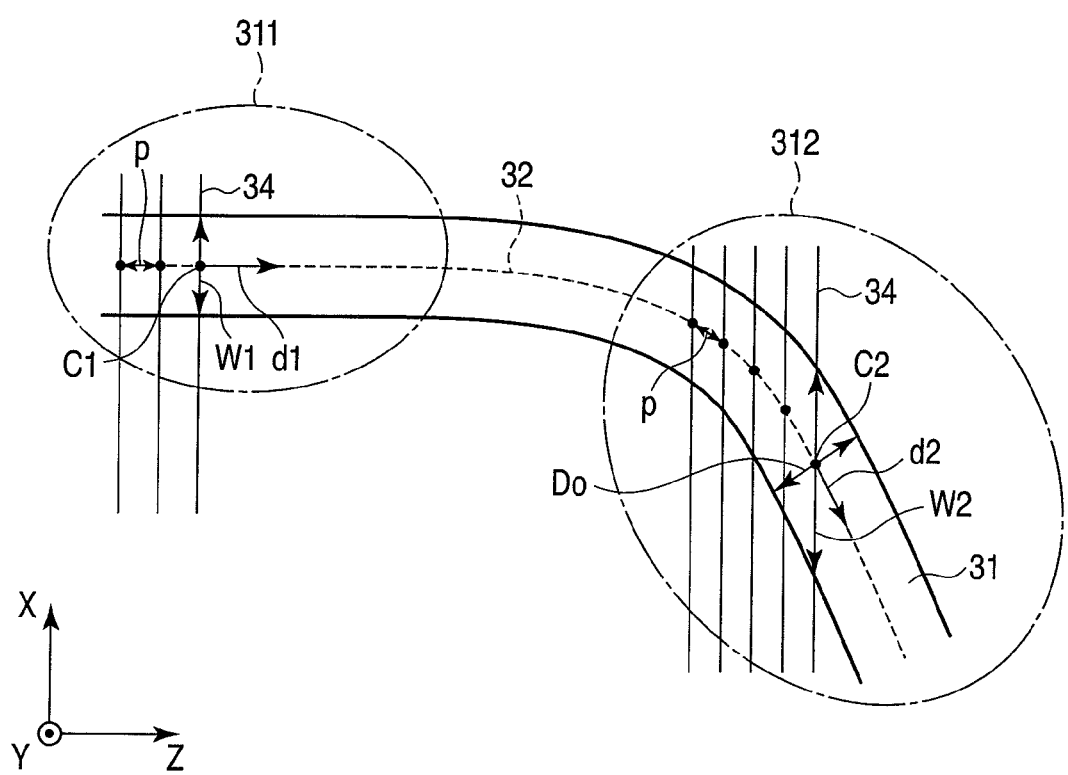
FIG. 3 is a view for explaining the disturbance of a CPR image data set.

The disturbance of a CPR image data set will be described next with reference to FIGS. 3 and 4. Assume that the plurality of cutting lines 34 are respectively set at a plurality of points on the centerline 32 of the blood vessel 31 having a diameter D0, as shown in FIG. 3. Assume that each cutting line 34 is set parallel to the X-axis. The cutting lines 34 are set on the centerline 32 at predetermined intervals p. The blood vessel 31 curves, as it extends in the +Z direction, so as to be parallel to the cutting lines 34. Consider a point C1 on the centerline 32 in a blood vessel portion 311 perpendicular to the cutting lines 34 and a point C2 on the centerline 32 in a blood vessel portion 312 which curves so as to be parallel to the cutting lines 34. An extending direction d2 of the centerline 32 at the point C2 defines an acute angle relative to the cutting line 34 as compared with a extending direction d1 of the centerline 32 at the point C1. A width W1 of the blood vessel 31 along the cutting line 34 set at the point C1 is equal to the diameter D0, but a width W2 of the blood vessel 31 along the cutting line 34 set at the point C2 is larger than the blood vessel diameter D0.

FIG. 4 shows the CPR image data set 40 concerning a plane constituted by the plurality of cutting lines 34 shown in FIG. 3. As shown in FIG. 4, a blood vessel portion 313 on the CPR image data set 40 which originates from the blood vessel portion 311 perpendicular to the cutting lines 34 in FIG. 3 is free from image disturbance. In contrast, a blood vessel portion 314 on the CPR image data set 40 which originates from the blood vessel portion 312 curving so as to be parallel to the cutting lines 34 looks expanded. That is, as the extending direction of the centerline 32 defines an acute angle relative to the cutting lines 34, the image is disturbed.

The image processing apparatus 1 according to this embodiment generates a plurality of CPR image data sets with cutting lines having different directions. And the image processing apparatus 1 displays a CPR image which exhibits the least image disturbance originating from a blood vessel portion extending in a direction which is not perpendicular to the cutting lines.

Figure 5:
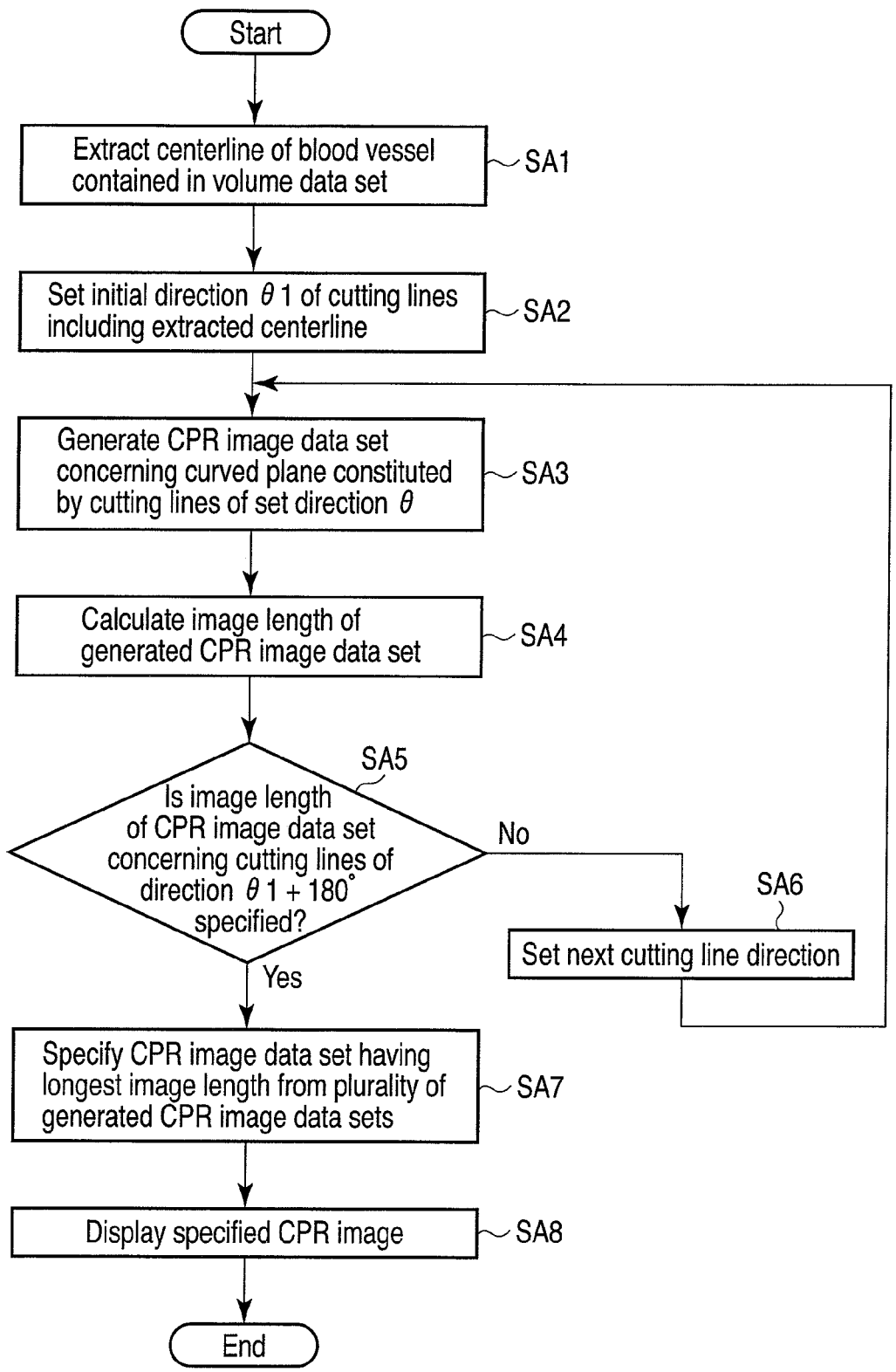
FIG. 5 is a flowchart showing a procedure for longest CPR image display processing performed under the control of a control unit in FIG. 1.

Longest CPR image display processing performed under the control of the control unit 10 will be described below. FIG. 5 is a flowchart showing a procedure for longest CPR image display processing.

When the user issues an instruction to start longest CPR image display processing via the input unit 12, the control unit 10 causes the centerline extraction unit 162 of the CPR processing unit 16 to perform centerline extraction processing (step SA1).

In the centerline extraction processing, the centerline extraction unit 162 extracts the centerline of a blood vessel from volume data set by using an existing technique. In this case, the centerline is extracted as a point sequence. The techniques which can be used to extract a centerline include, for example, the Vessel tracking method (e.g., Onno Wink, Wiro J. Niessen, "Fast Delination and Visualization of Vessel in 3-D Angiographic Images", IEEE Trans. Med. Imag. Vol. 19, No. 4, 2000) and a method of thinning the internal region of a luminal organ (e.g., G. D. Rubin, D. S. Paik, P. C. Johnston, S. Napel, "Measurement of the Aorta and Its Branches with Helical CT," Radiology, Vol. 206, No. 3, pp. 823-9, March, 1998).

When a centerline is extracted, the control unit 10 causes the CPR image generation unit 164 of the CPR processing unit 16 to perform setting processing for an initial cutting line direction (step SA2). In the setting processing for the initial cutting line direction, the CPR image generation unit 164 sets the direction designated by the user via the input unit 12 or a preset direction to an initial cutting line direction $\theta 1$.

When the initial cutting line direction $\theta 1$ is set, the control unit 10 causes the CPR image generation unit 164 to perform CPR image generation processing (step SA3). In the CPR image generation processing, the CPR image generation unit 164 sets a curved plane in volume data set such that a plurality of cutting lines having the set direction $\theta 1$ pass through a plurality of points constituting the centerline. The CPR image generation unit 164 then generates a CPR image data set by spreading the set curved plane on a flat plane. Note that it is possible to set cutting lines at all points constituting a centerline or every several points. If there is a lack in resolution in the z-axis direction of a CPR image data set, it is possible to interpolate the lack based on the pixel value of each pixel on cutting lines.

When the CPR image data set is generated, the control unit 10 causes the image length calculation unit 182 of the image specification unit 18 to perform image length calculation processing (step SA4). In the image length calculation processing, the image length calculation unit 182 calculates the image length of the generated CPR image data set. The storage unit 14 stores the CPR image data set in association with the calculated image length.

The processing in steps SA3 and SA4 is repeated a plurality of number of times while the cutting line direction is changed. As shown in FIG. 6, cutting lines are sequentially set at predetermined angular intervals (e.g., 5°) around a predetermined rotational axis RA from a direction $\theta 1$ to +180°. The angular intervals may be set in advance or arbitrarily set via the input unit 12.

When an image length is calculated in step SA4, the control unit 10 determines whether the image length of a CPR image data set concerning cutting lines of a direction ($\theta 1+180°$) is calculated (step SA5). Upon determining that the image length of the CPR image data set concerning the cutting lines of the direction ($\theta 1+180°$) is not calculated (step SA5: NO), the control unit 10 causes the CPR image generation unit 164 to rotate the cutting lines through a predetermined angle around a predetermined rotational axis so as to set next cutting lines (step SA6). With the cutting lines set in step SA6, the control unit 10 repeats step SA3 by the CPR image generation unit 164 and step SA4 by the image length calculation unit 182.

Upon determining in step SA5 that the image length of the CPR image data set concerning the cutting lines of the direction ($\theta 1+180°$) is calculated (step SA5: YES), the control unit 10 causes the longest image specification unit 184 of the image specification unit 18 to perform image specification processing (step SA7).

In the image specification processing, the longest image specification unit 184 specifies a longest CPR image data set from a plurality of generated CPR image data sets. FIG. 7 is a view showing two CPR image data sets 40A and 40B with cutting lines having different directions, and image lengths LA and LB of the respective image data sets. As shown in FIG. 7, a blood vessel region 31A depicted in the CPR image data set 40A in a cutting line direction $\theta A$ is greatly curved on the image as compared with a blood vessel region 31B depicted in the CPR image 40B in a cutting line direction $\theta B$. Therefore, the image length LA of the CPR image data set 40A is shorter than the image length LB of the CPR image data set 40B. In this manner, the image length of a CPR image data set changes in accordance with the cutting line direction. A CPR image data set with a longer image length is smaller in a blood vessel portion extending in a direction which is not perpendicular to cutting lines than a CPR image data set with a shorter image length. That is, the longer the image length, the smaller the image disturbance originating from a blood vessel portion extending in a direction which is not perpendicular to the cutting lines. Consequently, the longest CPR image data set suffers from the least image disturbance among a plurality of generated CPR image data sets.

When a longest CPR image data set is specified, the control unit 10 causes the display unit 20 to perform display processing (step SA7). In this display processing, the display unit 20 reads out the specified longest CPR image data set from the storage unit 14 and displays it.

Note that in step SA7, a longest CPR image data set is directly specified from image lengths. However, this embodiment need not be limited to this. For example, it is possible to specify a longest CPR image data set based on the aspect ratios of CPR image data sets. An aspect ratio is, for example, the ratio of an image length in a cutting line direction to an image length in a direction perpendicular to the cutting lines. In the case shown in FIG. 7, for example, an aspect ratio is the ratio of an image length along the x-axis to an image length along the z-axis. In this case, the longest image specification unit 184 specifies a CPR image data set with the largest aspect ratio as a longest CPR image data set.

Alternatively, it is possible to specify a longest CPR image data set based on the areas of blood vessel regions on CPR image data sets. In this case, the longest image specification unit 184 specifies, as a longest CPR image data set, a CPR image data set containing a blood vessel region having the largest area.

The above longest CPR image display processing is targeted at a CPR image data set generated by general CPR processing, i.e., a CPR image data set containing its blood vessel region meandering. However, this display processing can be applied to a CPR image data set generated by stretched CPR (SPR) processing as an application of CPR processing. A CPR image generated by SPR processing contains a blood vessel region linearly depicted in the image. In this case, the longest image specification unit 184 specifies, as a longest CPR image data set, a CPR image data set containing the largest image length in a direction (z-axis) perpendicular to the cutting lines as in the above display processing.

Figure 8:
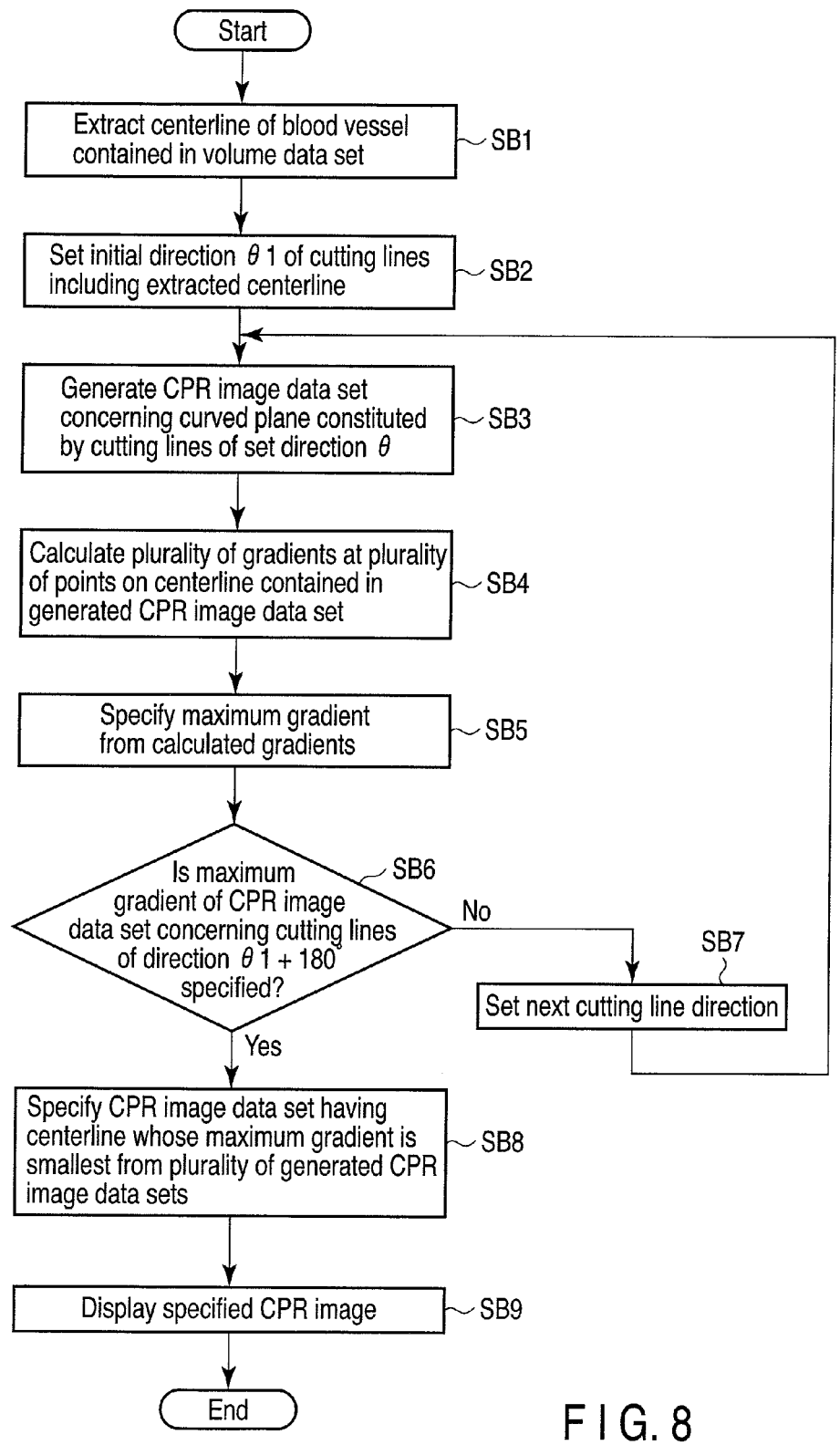
FIG. 8 is a flowchart showing a procedure for minimum-gradient CPR image display processing performed under the control of the control unit in FIG. 1.

Minimum-gradient CPR image display processing performed under the control of the control unit 10 will be described next. FIG. 8 is a flowchart showing a procedure for minimum-gradient CPR image display processing.

When the user issues an instruction to start minimum-gradient CPR image display processing via the input unit 12, the control unit 10 causes the centerline extraction unit 162 of the CPR processing unit 16 to perform centerline extraction processing (step SB1).

When a centerline is extracted, the control unit 10 causes the CPR image generation unit 164 of the CPR processing unit 16 to perform setting processing for an initial cutting line direction (step SB2). In the setting processing for an initial cutting line direction, the CPR image generation unit 164 sets the direction designated by the user via the input unit 12 or a preset direction to the initial cutting line direction θ1.

When the initial cutting line direction θ1 is set, the control unit 10 causes the CPR image generation unit 164 to perform CPR image generation processing (step SB3). In the CPR image generation processing, the CPR image generation unit 164 generates a CPR image data set concerning a curved plane constituted by a plurality of cutting lines of the set direction θ1.

When the CPR image data set is generated, the control unit 10 causes the gradient calculation unit 186 of the image specification unit 18 to perform gradient calculation processing (step SB4). In the gradient calculation processing, the gradient calculation unit 186 segments the centerline on the CPR image data set at minute intervals and calculates the gradient of the centerline in each minute segment. More specifically, the gradient calculation unit 186 calculates the gradient of a line (tangent) connecting the two end points of each minute segment as the gradient of the centerline in the minute segment. Note that gradient calculation is not limited to the above method. For example, the gradient calculation unit 186 may approximate a plurality of points on a centerline into a curved line, segment the approximate curved line at minute intervals, and calculate the gradient of a tangent of the approximate curved line in each segment as the gradient of a tangent of the centerline. It is possible to perform this curved line approximation by using any existing method such as spline interpolation or Lagrange interpolation.

When the gradient of the centerline in each minute segment is calculated, the control unit 10 causes the gradient calculation unit 186 to perform maximum gradient specification processing (step SB5). In the maximum gradient specification processing, the gradient calculation unit 186 specifies the maximum gradient of the plurality of calculated gradients as the maximum gradient of the centerline of the CPR image data set. The storage unit 14 stores the CPR image data set in association with the maximum gradient.

When the maximum gradient is specified in step SB5, the control unit 10 determines whether the maximum gradient of the CPR image data set concerning the cutting lines of the direction (θ1+180°) is specified (step SB6). Upon determining that the maximum gradient of the CPR image data set concerning the cutting lines of the direction (θ1+180°) is not specified (step SB6: NO), the control unit 10 causes the CPR image generation unit 164 to rotate the cutting lines through a predetermined angle around a predetermined rotational axis so as to set next cutting lines (step SB7). With the cutting lines set in step SB7, the control unit 10 sequentially repeats step SB3 by the CPR image generation unit 164, step SB4 by the gradient calculation unit 186, and step SB6 by the gradient calculation unit 186.

Upon determining in step SB6 that the maximum gradient of the CPR image data set concerning the cutting lines of the direction (θ1+180°) is specified (step SB6: YES), the control unit 10 causes the minimum-gradient image specification unit 188 of the image specification unit 18 to perform image specification processing (step SB8). In the image specification processing, the minimum-gradient image specification unit 188 specifies a minimum-gradient CPR image data set containing a centerline having the minimum gradient among the plurality of maximum gradients from the plurality of CPR image data sets.

Figure 9:
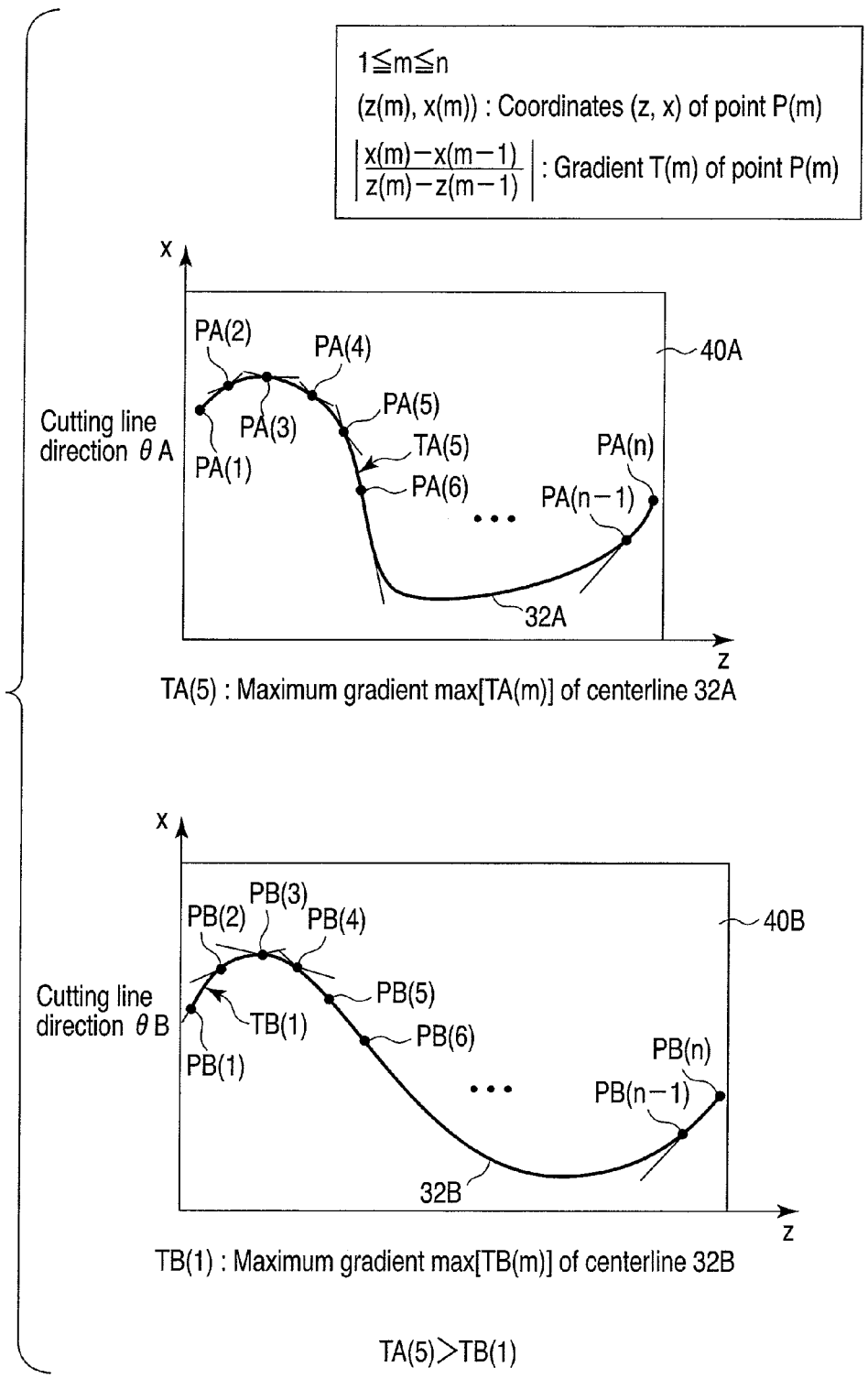
FIG. 9 is a graph for explaining specification processing for a minimum-gradient CPR image in step SB8 in FIG. 8.

FIG. 9 is a view showing the gradients of the centerlines 32A and 32B of two CPR image data sets with cutting lines having different directions. As shown in FIG. 9, a gradient is calculated as the ratio between the distance between points in the direction perpendicular to a cutting line and the distance between points in a parallel direction. More specifically, a gradient is calculated as the ratio of the distance between points in the parallel direction to the distance between points in the direction perpendicular to the cutting line. For example, as illustrated in FIG. 9, n and m are both arbitrary integers where z(m) and x(m) specify the coordinates at a point P(m). A gradient T(m) at the point P(m) is defined as a ratio x(m)−x(m−1)/z(m)−z(m−1). Maximum gradient max [TA(m)]=TA(5) of the centerline 32A on the CPR image data set in a cutting line direction θA is calculated as the distance between a point PA(5) and a point PA(6). Maximum gradient max [TB(m)]=TB(1) of the centerline 32B on the CPR image data set in a cutting line direction θB is calculated as the distance between a point PB(1) and a point PB(2). In addition, the centerline 32A on the CPR image data set in the cutting line direction θA greatly curves in the x-axis direction as compared with the centerline 32B on the CPR image dada set in the cutting line direction θB. Therefore, the maximum gradient TA(5) of the centerline 32A is larger than the maximum gradient TB(5) of the centerline 32B.

As is obvious from the observation of the portion of the centerline 32A which corresponds to the interval between a point PA(5) and a point PA(6) in which the maximum gradient TA(5) is calculated, a centerline portion with an acute gradient extends at an acute angle relative to the x-axis, i.e., the cutting line, as compare with a centerline portion with a moderate gradient. That is, the smaller the maximum gradient of a centerline contained in an image, the smaller the image disturbance originating from a blood vessel portion extending in a direction which is not perpendicular to cutting lines. That is, a CPR image data set having a centerline whose maximum gradient is the smallest suffers from the least image disturbance among a plurality of generated CPR image data sets.

When a CPR image data set having a centerline whose maximum gradient is the smallest is specified, the control unit 10 causes the display unit 20 to perform display processing (step SB9). In this display processing, the display unit 20 reads out the specified CPR image data set from the storage unit 14 and displays it.

As described above, the image processing apparatus 1 according to this embodiment generates a plurality of CPR image data sets concerning a plurality of curved planes, automatically specifies a longest CPR image data set or a minimum-gradient CPR image data set among the plurality of generated CPR images, and initially displays the specified image. This longest CPR image data set or minimum-gradient CPR image data set suffers from the least image disturbance originating from a blood vessel portion extending in a direction which is not perpendicular to the cutting lines among the plurality of CPR image data sets. This embodiment, therefore, improves the efficiency of image diagnosis using CPR image data sets.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a storage unit configured to store a volume data set containing a tubular structure in a predetermined coordinate system;
an extraction unit configured to extract a centerline of the tubular structure from the volume data set;
an image generation unit configured to generate data for a first curved multi-planar reconstruction (CPR) digital image for a first curved plane along the centerline and a second CPR digital image for a second curved plane along the centerline based on the volume data set;
an image specification unit configured to select one of the first CPR digital image and the second CPR digital image that has an image length that is longer than the other one; and
a display unit configured to display the selected one of the first CPR digital image and the second CPR digital image,
wherein the image generation unit generates the first curved plane and the second curved plane based upon a plurality of cutting lines passing through points along the centerline respectively at a first predetermined angle and a second predetermined angle,
wherein the image specification unit determines a first image length based upon the image length of the first CPR digital image along an axis that is perpendicular to a direction of the cutting lines at the first predetermined angle and a second image length based upon the image length of the second CPR digital image along an axis that is perpendicular to a direction of the cutting lines at the second predetermined angle, the image specification unit selecting a longer one of the first image length and the second image length.

2. An image processing apparatus comprising:
a storage unit configured to store a volume data set containing a tubular structure in a predetermined coordinate system;
an extraction unit configured to extract a centerline of the tubular structure from the volume data set;
an image generation unit configured to generate data for a first curved multi-planar reconstruction (CPR) digital image for a first curved plane along the centerline and a second CPR digital image for a second curved plane along the centerline based on the volume data set;
an image specification unit configured to select one of the first CPR digital image and the second CPR digital image; and
a display unit configured to display the selected one of the first CPR digital image and the second CPR digital image,
wherein the image generation unit generates the first curved plane and the second curved plane based upon a plurality of cutting lines passing through points along the centerline respectively at a first predetermined angle and a second predetermined angle,
wherein the image specification unit determines a plurality of first gradients as each specified by a gradient of the center line that is perpendicular to a direction of the cutting lines at the first predetermined angle, the image specification unit selecting a largest one of the first gradients as a first maximum gradient, the image specification unit determines a plurality of second gradients as each specified by a gradient of the center line that is perpendicular to a direction of the cutting lines, the image specification unit selecting a largest one of the second gradients as a second maximum gradient, the image specification unit selecting one of the first CPR digital image and the second CPR digital image that has a smaller one of the first maximum gradient and the second maximum gradient.

3. An image processing method comprising:
storing a digital volume data set containing a tubular structure in a predetermined coordinate system;
extracting a centerline of the tubular structure from the digital volume data set;
generating digital data for a first curved multi-planar reconstruction (CPR) digital image for a first curved plane along the centerline and a second CPR digital image for a second curved plane along the centerline based on the volume data set, wherein the first curved plane and the second curved plane are generated based upon a plurality of cutting lines passing through points along the centerline respectively at a first predetermined angle and a second predetermined angle;
selecting one of the first CPR digital image and the second CPR digital image that has an image length that is longer than the other one, wherein a first image length is based upon the image length of the first CPR digital image along an axis that is perpendicular to a direction of the cutting lines at the first predetermined angle while a second image length is based upon the image length of the second CPR digital image along an axis that is perpendicular to a direction of the cutting lines at the second predetermined angle, the selected one of the first CPR digital image and the second CPR digital image having a longer one of the first image length and the second image length; and
displaying the selected one of the first CPR digital image and the second CPR digital image.

4. An image processing method comprising:
storing a volume digital data set containing a tubular structure in a predetermined coordinate system;
extracting a centerline of the tubular structure from the volume digital data set;
generating data for a first curved multi-planar reconstruction (CPR) digital image for a first curved plane along the centerline and a second CPR digital image for a second curved plane along the centerline based on the volume data set, wherein the first curved plane and the second curved plane are generated based upon a plurality of cutting lines passing through points along the centerline respectively at a first predetermined angle and a second predetermined angle;
selecting one of the first CPR digital image and the second CPR digital image, wherein a plurality of first gradients are each specified by a gradient of the center line that is perpendicular to a direction of the cutting lines at the first predetermined angle, a largest one of the first gradients being defined as a first maximum gradient, a plurality of second gradients are being each specified by a gradient of the center line that is perpendicular to a direction of the cutting lines at the second predetermined angle, a largest one of the second gradients being defined as a second maximum gradient, one of the first CPR digital image and the second CPR digital image is selected for having a smaller one of the first maximum gradient and the second maximum gradient; and displaying the selected one of the first CPR digital image and the second CPR digital image.

\* \* \* \* \*